(12) United States Patent
Hamze

(10) Patent No.: US 10,728,631 B2
(45) Date of Patent: Jul. 28, 2020

(54) RECORDED CONTENT GENERATION FOR MOBILE DEVICES

(71) Applicant: Global Multimedia Investment Limited, London Greater London (GB)

(72) Inventor: Abou Hamze, Beirut (LB)

(73) Assignee: GLOBAL MULTIMEDIA INVESTMENT LIMITED, London (GB)

(*) Notice: Subject to any disclaimer, the term of this patent is extended or adjusted under 35 U.S.C. 154(b) by 0 days.

(21) Appl. No.: 15/780,586

(22) PCT Filed: Mar. 18, 2016

(86) PCT No.: PCT/GB2016/050753
§ 371 (c)(1),
(2) Date: May 31, 2018

(87) PCT Pub. No.: WO2017/103556
PCT Pub. Date: Jun. 22, 2017

(65) Prior Publication Data
US 2018/0352308 A1     Dec. 6, 2018

Related U.S. Application Data

(60) Provisional application No. 62/267,699, filed on Dec. 15, 2015.

(51) Int. Cl.
*H04N 21/854* (2011.01)
*G06Q 10/10* (2012.01)
(Continued)

(52) U.S. Cl.
CPC ........... *H04N 21/854* (2013.01); *G06Q 10/10* (2013.01); *G06Q 30/0641* (2013.01);
(Continued)

(58) Field of Classification Search
CPC .............................. H04N 21/854; H04L 51/32
See application file for complete search history.

(56) References Cited

U.S. PATENT DOCUMENTS

| 8,477,196 B2 | 7/2013 | Wang et al. |
| 2007/0257782 A1 | 11/2007 | Etcheson |
| (Continued) | | |

FOREIGN PATENT DOCUMENTS

| EP | 1 906 666 A2 | 4/2008 |
| WO | WO 2012/009458 A2 | 1/2012 |

OTHER PUBLICATIONS

International Search Report, PCT/GB2016/050753, dated Jun. 7, 2016.

*Primary Examiner* — Girumsew Wendmagegn
(74) *Attorney, Agent, or Firm* — Finnegan, Henderson, Farabow, Garrett & Dunner, L.L.P.

(57) ABSTRACT

Systems, methods, and devices for generating digital media content. An application executing on a user digital device controls the device's audio or video sensor to record an event. The recorded content is then automatically copied to a segregated section of the device. The recorded content is then automatically uploaded to a server. Once uploaded, the recorded content is then assessed and considered by staff associated with the server and a specific service. If the recorded content is deemed to be acceptable, a monetary value is then associated with the recorded content according to a predetermined scale and this monetary value is applied to the user's account with the service. The recorded content is then marked as being associated with the service and is made available to the public. The user who generated the content can then withdraw the monetary value in his account or convert it into suitable currency.

13 Claims, 2 Drawing Sheets

(51) Int. Cl.
    *G06Q 30/06*     (2012.01)
    *H04L 12/58*     (2006.01)
    *H04N 21/4788*     (2011.01)
    *G06F 16/40*     (2019.01)

(52) U.S. Cl.
    CPC ......... *H04L 51/32* (2013.01); *H04N 21/4788* (2013.01); *G06F 16/40* (2019.01)

(56) References Cited

U.S. PATENT DOCUMENTS

| | | | | |
|---|---|---|---|---|
| 2009/0265277 A1* | 10/2009 | Mullen | ............. | G06F 17/30038 |
| | | | | 705/51 |
| 2011/0276423 A1* | 11/2011 | Davidson | ............... | G06Q 30/06 |
| | | | | 705/26.1 |
| 2015/0302009 A1* | 10/2015 | Henderson | ............. | G06N 20/00 |
| | | | | 707/609 |
| 2017/0070302 A1* | 3/2017 | Tuscano | ................ | H04H 20/04 |

* cited by examiner

US 10,728,631 B2

RECORDED CONTENT GENERATION FOR MOBILE DEVICES

TECHNICAL FIELD

The present invention relates to digital media content. More specifically, the present invention relates to systems, methods, and devices for generating digital media content using user consumer devices such as smartphones and tablet computers.

BACKGROUND

The proliferation of smartphones and other mobile computing devices equipped with audio-visual capabilities (e.g. tablet computers) has led to an explosion of user created digital content. Video sharing websites such as YouTube, Vimeo, Daily Motion, LiveLeak, and many others, allow users to freely upload and share their videos. Similarly, user generated pictures can also be shared using websites such as Vine, Flickr, 500px, imgur, and others. Audio files can also be shared using websites such as bandcamp, clyp, soundcloud, and others. However, other than revenues from advertisements for the various media content displayed, users who generate such content generally do not share in the profits from the content. While YouTube and a few other websites provide rewards to users who upload such content based on how many times the content is viewed, media content generators (i.e. users who create original content) have to wait until, and if, their uploaded content becomes famous.

One issue with the above model for generating monetary rewards for the content generator or user is that the content generator does not share in the profits until the content is widely viewed or seen. As well, the content generator is, generally, free to re-upload the content generated to multiple websites. The websites, therefore, do not have exclusivity with respect to the content generated.

As well, content generated that might be of cultural or historical significance, but that might not be overly popular, will not generate as much income for the user who generated that content. As has seen in recent events, social and political upheavals are usually caught on video by either the participants or by the spectators. Riots, protests, and other historic events might not be popular and, as such, would not generate income for the user who generated that content. However, such a user should be rewarded for capturing history as it unfolded. Currently, other than the dubious notoriety that comes with generating such content, these users are not rewarded.

Currently, there are no websites or services which reward users for generated digital media content before the content is presented to the public. As well, there are no websites or services that allows for exclusivity with respect to the content.

There is therefore a need for systems or methods which mitigate if not overcome the shortcomings of the prior art.

SUMMARY

The present invention provides systems, methods, and devices for generating digital media content. A software application executing on a user digital device controls the device's audio or video sensor to record an environment surrounding the device. The recorded content, once optionally tagged, described, and titled by the user, is then automatically copied to a segregated section of the device. The recorded content is then automatically uploaded to a server. Once uploaded, the recorded content is then assessed and considered by staff associated with the server and a specific service. If the recorded content is deemed to be acceptable, a monetary value is then associated with the recorded content according to a predetermined scale and this monetary value is applied to the user's account with the service. The recorded content is then marked as being associated with the service and is made available to the public. The user who generated the content can then withdraw the monetary value in his account or convert it into suitable currency.

In a first aspect, the present invention provides a method for generating digital media content using a user device, the method comprising:
  a) activating a sensor on said device to thereby receive input from an environment about said device;
  b) caching said input on said device to thereby record said input and produce recorded content;
  c) receiving user input from said user to stop a recording of said input;
  d) terminating said recording and copying recorded content to a segregated section of a storage medium on said user device;
  e) automatically transmitting said recorded content to a remote server from said user device;
  f) automatically deleting said recorded content from said user device;
  wherein said user device is a mobile consumer device.

In a second aspect, the present invention provides a system for generating digital media content using a user device, the system comprising:
  a sensor module for activating and deactivating a sensor on said user device;
  a content generation module for communicating with said sensor module and for receiving content recorded by said sensor, recorded content being generated once recording by said sensor has been terminated;
  a storage module for caching said content recorded by said sensor and for automatically transferring recorded content to a segregated section of said user device once recording of said content has terminated;
  a send/receive module for automatically transmitting said recorded content from said user device to a remote server;
  wherein said recorded content is automatically deleted from said user device once said recorded content has been transmitted to said remote server.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
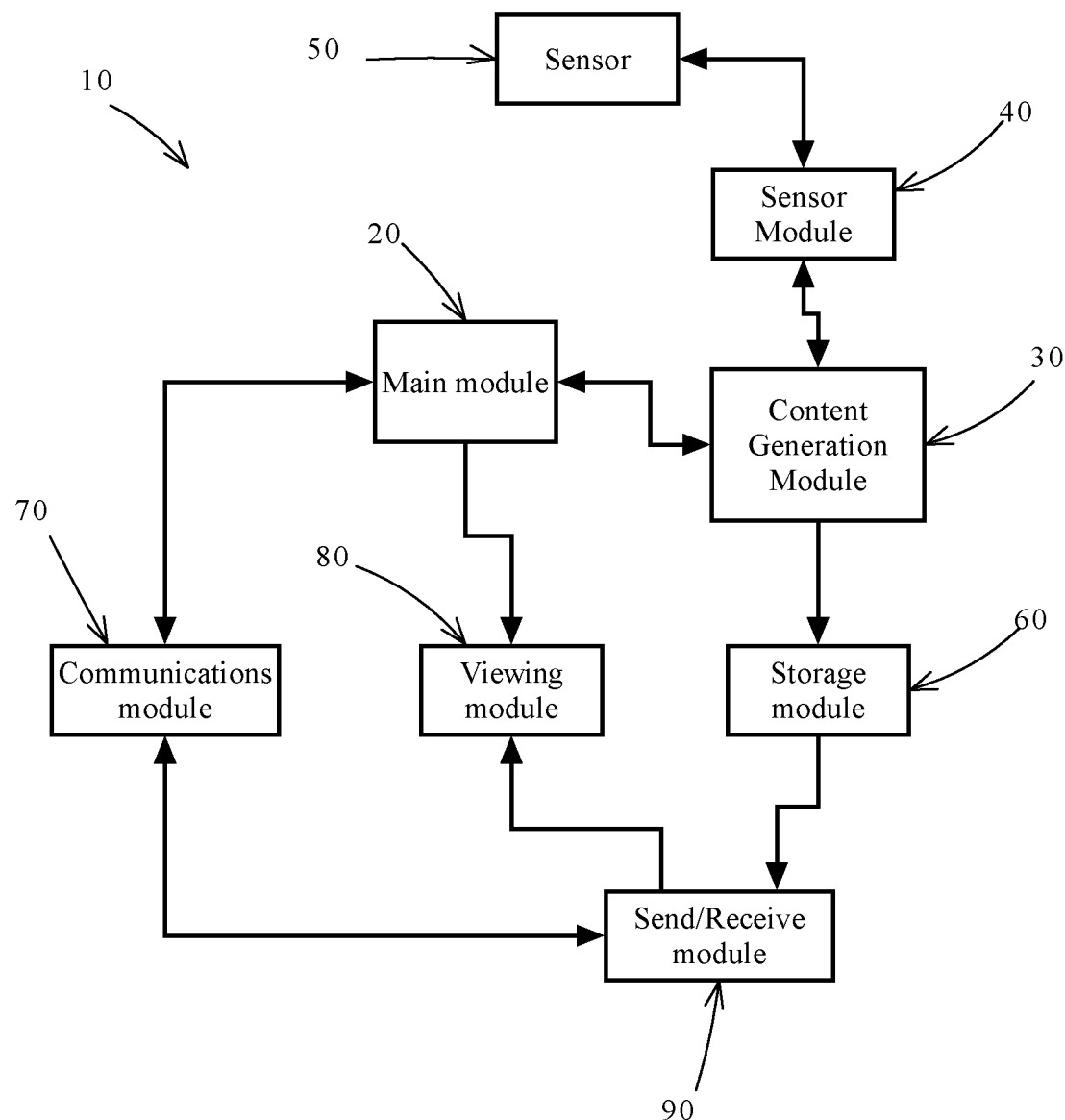
FIG. 1 is a block diagram of a system according to one aspect of the invention.

Referring to FIG. 1, a block diagram of a system according to one aspect of the invention is illustrated. The system 10 may take the form of a software application (or "app") executing on a user mobile consumer device such as a smart phone, mobile phone, tablet computer, or other portable computing device equipped with a video camera, a regular camera, and/or a microphone and is capable of recording video, photographs, or audio. As can be seen, the system 10 has a main module 20 that serves as a main gateway for a user using the system. The main module 20 communicates with a content generation module 30 which, in turn, communicates with a sensor module 40. The sensor module 40 controls a sensor 50 to receive analog input from its surroundings. Also part of the system 10 is a storage module 60, a communications module 70, and a viewing module 80. The communications module 70, the viewing module 80, and the storage module 60 interact with a send/receive module 90 to send/receive data by wireless means to a server 100.

In operation, the system 10 receives user input by way of the main module 20. Upon receiving user input to generate digital media content, the main module 20 commands the content generation module 30 to communicate with the sensor module 40. The sensor module 40 directly controls the sensor 50 to activate or deactivate the sensor 50. Activation of the sensor 50 causes the sensor 50 to receive analog input from its surroundings, digitize this analog input and send the digitized content to the content generation module 30. The digitized content is then cached or temporarily stored by a storage module 60 on the user device. Once the user wishes to terminate the recording of the content, the user initiates a terminate command by way of the main module 20. This causes the sensor 50 to be deactivated. After the sensor 50 has been deactivated, the recorded content has been generated. The recorded content is then transferred by the storage module 60 from its temporary storage on the user device to a segregated section or area of the user device. The user is then prompted to provide generated text content for the recorded content. Once this has been provided, the recorded content, along with the generated text content, is then automatically transmitted to a remote server by way of the send/transmit module 90. Once transmission of the recorded content is complete, the recorded content is then automatically deleted from the segregated section of the user device. The only copy of the recorded content is therefore the copy sent to the remote server.

It should be noted that the sensor 50 may take the form of a video camera, a digital picture camera, an audio recording device (e.g. a microphone), or any combination thereof. Thus, the activation of the sensor 50 may cause both the video camera and the audio recording device to activate, thereby capturing both audio and video of what the user device is pointed to. Similarly, activation of the sensor 50 may activate a digital picture camera to cause a digital picture to be taken. Alternatively, the activation of the sensor 50 may simply cause an audio recording device to activate, thereby recording the audio of the area surrounding the user device. Thus, the recorded content may take the form of a digital video with audio, a silent digital video, a digital picture, or simply an audio recording.

Once the recorded content has been recorded and stored, the user is prompted to provide user generated text content. This text content may take the form of a title of the recorded content, a description of the recorded content, tags to be used with the recorded content, as well as any text which can be used to describe or indicate the recorded content. The user may be prompted to fill in specific fields of a form to be associated with the recorded content. Some fields of this form may be required while others may be optional. Once completed, the form is then associated with the recorded content and is transmitted along with the recorded content to the remote server.

It should be noted that the segregated section of the user device may be a section of a storage medium that either forms part of the storage device or a storage medium which has been added to the user device (e.g. a micro-SD card). The segregated section serves as a temporary storage for the recorded content prior to, and while, the recorded content is being transmitted to the remote server. While the recorded content is being recorded, the digital file being used may be the file used by the user device's operating system. Once the recording is finished, the recorded content is then moved from the default location to the segregated section. The segregated section can thus store the recorded content while the user enters the text content to be associated with the recorded content. Once the text content is complete, the text content is stored and associated with the recorded content in the segregated section, along with the user information such as the user's account information to allow the user device to communicate with the remote server. The recorded content, its associated text content, and the user's account information are all automatically uploaded to the remote server. Once transmission is complete, the recorded content and the associated text content are then deleted from the user device. This prevents the user from posting the recorded content to other websites or servers. To prevent the user from copying the recorded content from the segregated section, the segregated section should be inaccessible to the user and, preferably, only accessible to the system 10. The system can thus write to and delete from the segregated section but the user should not be able to copy from or write to the segregated section.

It should be clear that the remote server and the application operating on the user device are both associated with and operated by a service entity that shares content uploaded by its users. Once the recorded content has been uploaded to the remote server, the recorded content can be assessed by the service entity's personnel or software. If determined to be suitable material for sharing, the recorded material is accepted by the service entity. A predetermined bounty or reward is then awarded by the service entity to the user. The reward can be credited to the user's account with the service entity and the user can be notified of this credit by any suitable means such as email. Alternatively, the reward can be sent using any suitable cryptocurrency such as BitCoin™. As another alternative, the reward can be credited to a third party account in the name of the user. Such a third party account (e.g. a PayPal™ account) would, of course, have to be known to the service entity so that funds or a credit which can be converted into funds, can be deposited. The notification to the user regarding the reward can be sent to the user by way of an electronic communication such as an email, an SMS message (i.e. a text message), or by using a dedicated communications link between the service entity and the user. In one implementation, the communications module 70 can be used as an electronic communications portal between the user (who is registered with the service entity) and the personnel at the service entity. The communications module 70 may also be used as a communications link between the user and other users registered with the service entity.

In yet another implementation, the predetermined bounty or reward awarded to users for their recorded content is based on a predetermined scale or table of values. Each instance of recorded content is associated with a monetary value based on a publicly available table of values provided by the service entity. Depending on the recorded content and on what the service entity desires in terms of type of content to be shared with its users, the table of values may assign differing values to different recorded content. As an example, the service entity may desire to be more news-centered. As such, recorded content relating to breaking news stories (e.g. a natural disaster, political upheaval, civil unrest, etc.) may be assigned higher monetary values than a humorous event. Conversely, the service entity may wish to have more user-created or user-staged content. As such, user-created content, such as humorous or outrageous stunts, pranks, or staged events may be assigned a higher monetary value than a humorous but unexpected event such as a cat playing on, and subsequently falling down, stairs. In one implementation, the predetermined scale or table of values is accessible to the user by way of the system (i.e. viewable by the user using the system). In another implementation, the scale or table is communicated to the user using the communication module or using any other means of electronic communication.

In addition to a pre-set table of values or scale of monetary rewards for certain types of recorded content, the service entity may offer time limited bounties for specific content based on any number of changing conditions. As an example, changing viewer preference trends may be used by the service entity to determine what content would be eligible for such time limited bounties. Thus, if videos involving llamas are trending with viewers as a preferred viewing choice, the service entity may offer a 24 hour bounty on videos with llamas or perhaps on videos involving other, similar animals such as camels or donkeys. Or, as another example, the service entity may offer bounties on recorded content relating to specific on-going events. A specific political rally or a press conference by a well-known politician, for example, might be occurring and the service entity may offer a bounty for recorded videos or recording audio from such an event. The bounty may, of course, be time limited to a few hours to a few days or even a few weeks as deemed necessary by the service entity. Such time limited bounties could be broadcast to users by the service entity using the communications module 70.

It should also be clear that the amount of the reward awarded to the user who generates the recorded content may be dependent upon a number of factors. These factors may include a quality of the recorded content. For example, a grainy picture or a grainy video or an unfocused picture or video may command less of a reward than a properly focused picture or video. Similarly, the length of the recorded content may also affect the amount of the reward for the user. For example, a 15 second video or audio clip may command less of a reward than a 30 second or a 5 minute video or audio clip. However, the length and/or quality of the recorded content may be superfluous in determining the amount of the reward if the event recorded by the recorded content is compelling. As an example, a 15 second video clip of a famous person committing a crime or a 10 second clip of a UFO landing may command a much higher reward than a 5 minute video of a dog playing in the snow. Thus, the nature of the event recorded in the recorded content as well as the fame or notoriety of the participants in the event may be used as a factor in determining the amount of the reward for the user.

Similarly, for recorded content that is a combination of both audio and video, the amount of audio or video content in the recorded content may also be a factor in the amount of reward for the user. As an example, a video recording of an event where there is minimal video but where the audio content is present (e.g. a political rally where the user is prevented from shooting video but the audio is recorded) may have a lower reward than a full audio and video recording of the same event. Conversely, a recording of an event where, for some reason, video is present but audio has been suppressed may qualify for a lower reward than, again, a full audio and video recording of the same event. These and other factors and the actual amounts of the rewards are, of course, dependent on the implementation of the invention.

Regarding assessment and/or filtering of recorded content, it should be clear that the service entity may employ various means to review uploaded recorded content for suitability. Software may be used to automatically filter the user generated text content associated with the recorded content to determine which recorded content is to be further reviewed. Recorded content that does not pass the initial software filters are rejected and no bounty or reward is awarded to the user. Recorded content that have passed the initial filters can be reviewed by human reviewers and approved or rejected by such reviewers. Recorded content which is approved can then be posted on the service entity's website or content feed for consumption by users. As noted above, if a user's recorded content is approved, the user is awarded a bounty or reward.

Approved recorded content can be marked by the service entity as being associated with a specific website or service. This marking, which may take the form of watermarking the videos or the pictures of the recorded content, can be done to prevent reuse by other websites or content providers. In addition to this marking, approved recorded content can have its associated text content edited by the service entity for content or suitability. Thus, a recorded content's user assigned title or description may be edited, changed, or completely replaced by the service entity prior to the recorded content being distributed or displayed on the service entity's website or content feed.

As can be imagined, a user using the software application aspect of the invention should, preferably, have an existing registered account with the service entity managing the remote server. Such a registered account would allow for ease of uploading recorded content to the remote server and the awarding of the reward or bounty for approved recorded content.

As part of the system 10, a viewing module 80 may be used by the user to view/consume content provided to the service entity from other users or from the user himself or herself. The viewing module 80 can communicate with the remote server to receive approved recorded content from other users for viewing and/or listening by the user. The viewing module 80 can thus be used to stream content from the remote server or to download content to the user device on a temporary basis. Content can be downloaded from the remote server to the segregated section so that the content can be played back to the user. Of course, once the downloaded content has been viewed/played back, it is then deleted from the user device. This can be done to prevent the downloaded content from being reused by the user in a manner which might not be approved by the service entity.

The viewing module 10 can be configured to present the user with the top viewed content according to user viewership or it can be presented to provide the latest recorded content approved for display by the service entity. Of course, in addition to the recorded content viewable by the user, the viewing module also presents text associated with the recorded content. As an example, each video or picture accepted for distribution would be displayed for the user along with descriptive text (which may be from the user who generated the recorded content or from the service entity staff), title, time and date of the recorded event, and length of the recording (if applicable). Optionally, tags associated with the recorded content or with the content of the recorded content (e.g. the event or the participants to the event) may also be displayed for the user.

Also as part of the system 10, the communications module 70 can be used for communications between the user and the service entity. As noted above, the communications module 70 can be used to notify the user of any rewards or bounty awarded by the service entity. Similarly, the communications module 70 can deliver messages from other users or other people with accounts with the service entity to the user. The communications module 70 may be dedicated to communications within the ecosystem of the service entity (e.g. communications between registered account holders using the service entity and communications to and from the service entity) or it may be used as a communications portal that accesses other email or electronic communication systems. As an example, the communications module 70 may have an email client able to access POP or IMAP servers. Alternatively, the communications module 70 may also be equipped with a user chat sub-module that allows for communications using any of the XMPP, SIMPLE, SIP, IRC, or AMQP protocols. The communications module may, in conjunction with the send/receive module, operate to use well-known communication technologies and protocols such as Wi-Fi, 802.11xx, 3G, 4G, and other similar devices and sub-systems.

It should further be noted that the send/receive module for use in automatically transmitting the recorded content to the server may use various types of communications protocols to communicate with the server. As an example, protocols used by mobile telephone handsets may be used as well as protocols used for short range wireless communications (e.g. Wi-Fi, Bluetooth). To this end, well-known communications modules used in mobile telephone handsets as well as in tablet computers may be used.

It should be noted that the service entity can generate revenue in ways other than the traditional advertising or subscription models. Traditionally, content sharing websites such as those listed above generate income by selling advertising space. More compelling or more user desired content on the website would increase the number of viewers for content and this, correspondingly, would lead to higher advertising revenues as greater viewership means more exposure for the advertisers. Conversely, users may need to subscribe to the website to access its content. Paying account holders thus generate revenue for the service entity. As another source of revenue, the system 10 may be either exclusively or preferably be installed on mobile devices such as mobile phones or handsets. Data consumption by the mobile handset, because of users accessing content on the service entity's website or by using the viewing module, would generate revenue for the mobile handset's mobile data service provider. This revenue can then be shared between the mobile data service provider and the service entity.

Figure 2:
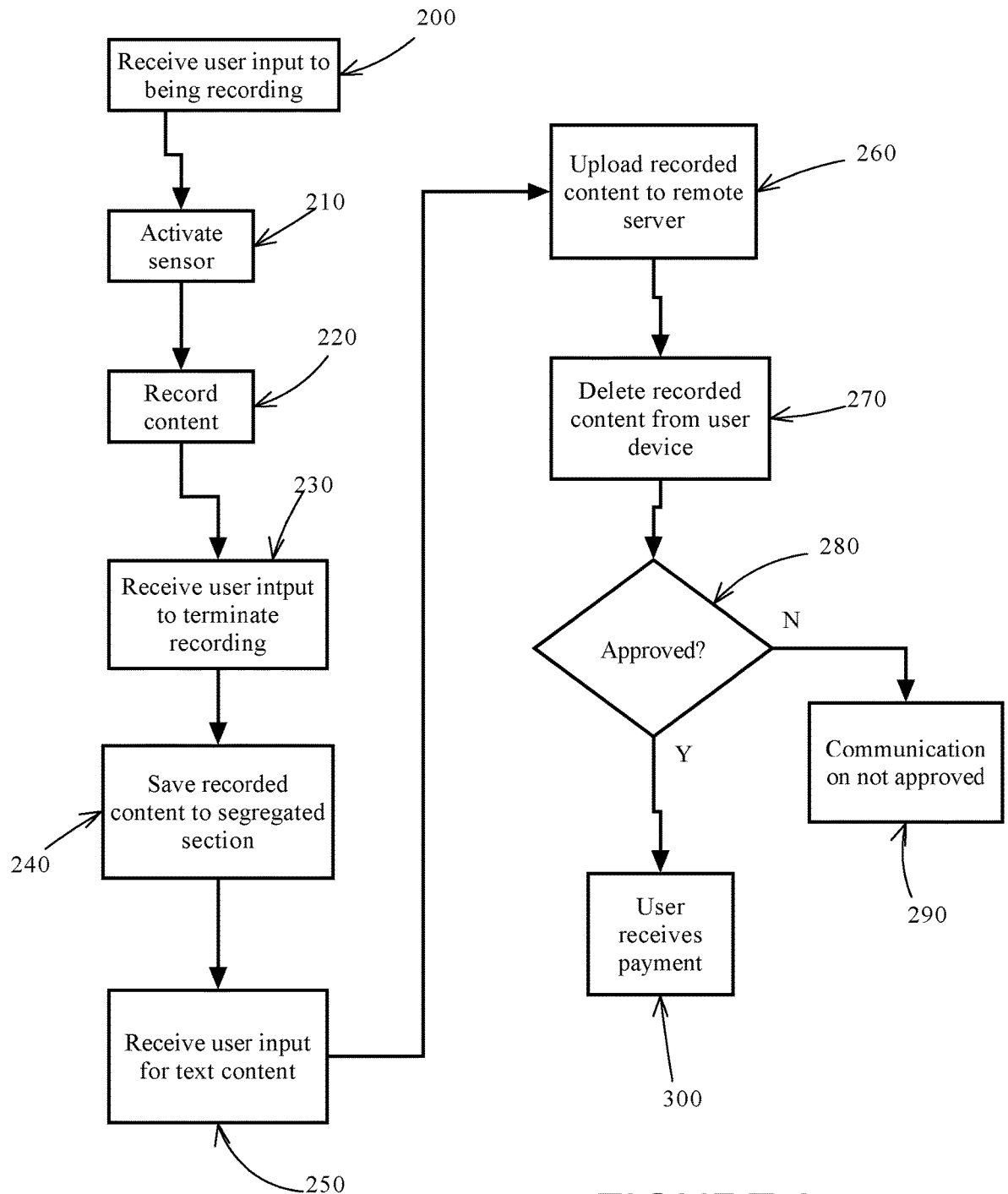
FIG. 2 is a flowchart detailing the steps according to another aspect of the invention.

Referring to FIG. 2, a flowchart detailing the steps executed by the system in FIG. 1 is illustrated. The method beings with step 200 as the system receives user input to being recording an event. Step 210 is that of activating the user device's sensor. As noted above, the sensor may be the user device's video camera, the microphone, the still camera, or any of combination thereof. The event is then recorded in step 220. The file generated as the event is being recorded is cached on the user device. In step 230, the system receives user input to terminate the recording. This causes step 240 as the system saves the recorded content to the user device's segregated section. The system can then receive user input for the text content to be associated with the recorded content (step 250). With the recorded content finished, including associating the user generated text content, the recorded content is then uploaded to the remove server (step 260). After the recorded content is uploaded, this recorded content is automatically deleted from the user device (step 270). At the remote server, the recorded content is then assessed as to its suitability for the service entity's website or content feed (step 280). As noted above, this may be done in discrete steps using both software filters and human viewers. In the event that the recorded content is not approved, the user may receive a communication that the recorded content has not been approved (step 290). Conversely, if the recorded content is approved, the user may then receive a communication that the recorded content has been approved and that a reward or bounty for the recorded content has been applied to the user's account (step 300). At some point subsequent to this, the user's recorded content is then displayed or distributed to the public by way of the service entity's website or content feed.

The embodiments of the invention may be executed by a computer processor or similar device programmed in the manner of method steps, or may be executed by an electronic system which is provided with means for executing these steps. Similarly, an electronic storage means such as computer diskettes, CD-ROMs, Random Access Memory (RAM), Read Only Memory (ROM) or similar computer software storage media known in the art, may be used in conjunction with programmed processors to execute such method steps. As well, electronic signals representing these method steps may also be transmitted via a communication network. Computer processors, microcontrollers, and other processing devices and means including microprocessors (e.g. microprocessors manufactured by Intel Corp., ARM, AMD, Freescale Semiconductor, and other companies), microcontrollers, SoC devices, and others may be used.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. A method for generating digital media content using a user device, the method comprising:
    a) activating a sensor on said device to receive input from an environment about said device;
    b) caching said input on said device to record said input and produce recorded content;
    c) receiving user input from said user to stop a recording of said input;
    d) terminating said recording and copying recorded content to a segregated section of a storage medium on said user device, wherein said segregated section is inaccessible to said user and is accessible to a service connected with a remote server;
    e) automatically transmitting said recorded content to the remote server from said user device;
    f) preventing transmission of said recorded content to another server connected with another service by automatically deleting said recorded content from said user device; and
    g) receiving a communication from the service connected with said remote server that said user's account with said service has been credited with a predetermined value before said recorded content is available to public,
    wherein said user device is a mobile consumer device and said predetermined value is based on:
        a picture quality of said recorded content;
        a length of said recorded content;
        an event recorded by said recorded content;
        participants in an event recorded by said recorded content;
        a type of said event recorded by said recorded content;
        an amount of audio content contained in said recorded content; and
        an amount of video content contained in said recorded content.

2. The method according to claim 1, wherein said mobile consumer device is chosen from:
    a mobile cellular handset;
    a smartphone; and
    a tablet computing device.

3. The method according to claim 1, wherein before step e) and after step d), step d1) comprises:
    receiving user generated text content from said user and associating said user generated text content with said recorded content, wherein said user generated text content is transmitted to said remote server with said recorded content.

4. The method according to claim 3, wherein said user generated text content is chosen from:
    a title
    a description of said recorded content;
    text indicative of said recorded content;
    tags to be associated with said recorded content; and
    combinations thereof.

5. The method according to claim 1, wherein said sensor is chosen from:
    a video camera;
    a picture camera;
    a microphone; and
    combinations thereof.

6. The method according to claim 1, wherein said communication indicates that a version of said recorded content is available for consumption by the public.

7. The method according to claim 6, wherein data used by said public to consume said recorded content generates revenue for a mobile data service provider, wherein said revenue is shared between said mobile data service provider and said service.

8. The method according to claim 1, wherein said recorded content is chosen from:
    a picture;
    a video clip;
    an audio recording; and
    combinations thereof.

9. The method according to claim 1, further comprising a step of receiving a previous communication from said service indicating a type or content of recorded content requested by said service from said user.

10. The method according to claim 9, wherein said previous communication indicates an amount to be paid by said service for said recorded content requested by said service from said user.

11. The method according to claim 9, wherein said type of recorded content requested by said service from said user is based on changing viewer preferences for recorded content.

12. The method according to claim 1, wherein step g) is executed only after said recorded content has been accepted by said service to be made available for consumption by a public.

13. A system for generating digital media content using a user device, the system comprising:
    a sensor module for activating and deactivating a sensor on said user device;
    a content generation module for communicating with said sensor module and for receiving content recorded by said sensor, wherein recorded content from said sensor is generated once recording by said sensor has been terminated;
    a storage module for caching said content recorded by said sensor and for automatically transferring recorded content to a segregated section of said user device once recording of said content has terminated, said segregated section is inaccessible to said user and is accessible to a service connected with a remote server; and
    a send/receive module for automatically transmitting said recorded content from said user device to a remote server and for receiving a communication from the service connected with said remote server that said user's account with said service has been credited with a predetermined value before said recorded content is available to a public, wherein said predetermined value is based on a content of said recorded content before said recorded content is available to a public, and said predetermined value is based on
    a picture quality of said recorded content;
    a length of said recorded content;
    an event recorded by said recorded content;
    participants in an event recorded by said recorded content;
    a type of said event recorded by said recorded content;
    an amount of audio content contained in said recorded content; and an amount of video content contained in said recorded content;

and wherein said recorded content is automatically deleted from said user device once said recorded content has been transmitted to said remote server to prevent transmission of said recorded content to another server connected with another service.

\* \* \* \* \*